Oct. 13, 1931.  W. L. PATTERSON  1,827,101

PROJECTOR FOR STRIP FILMS

Filed March 13, 1928   2 Sheets-Sheet 1

William L. Patterson
INVENTOR

BY Cumpston & Griffith
his ATTORNEYS

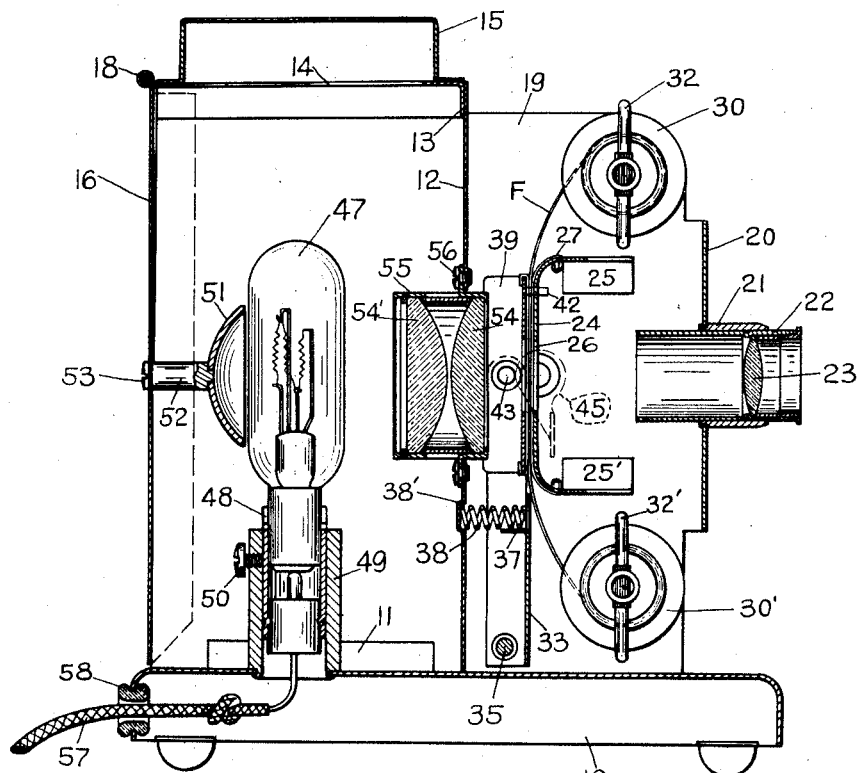
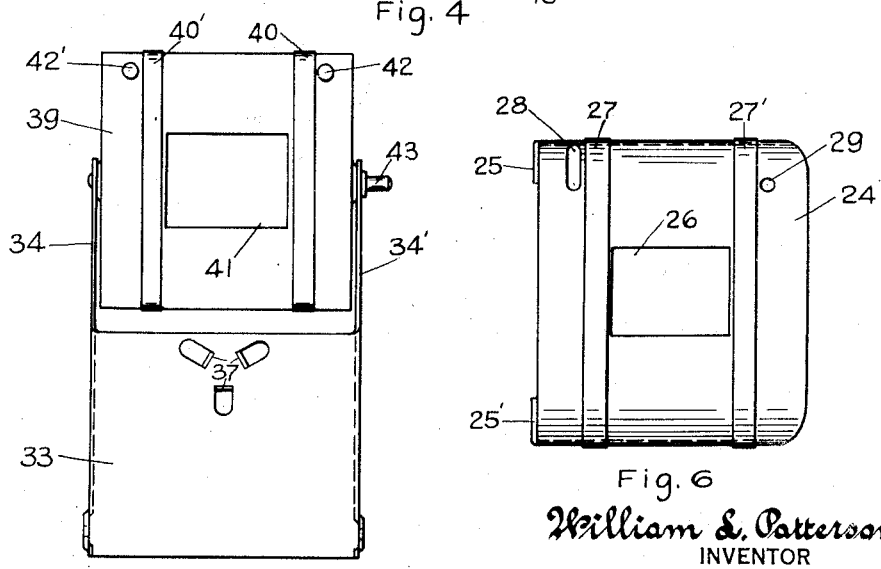

Patented Oct. 13, 1931

1,827,101

UNITED STATES PATENT OFFICE

WILLIAM L. PATTERSON, OF ROCHESTER, NEW YORK, ASSIGNOR TO BAUSCH & LOMB OPTICAL COMPANY, OF ROCHESTER, NEW YORK, A CORPORATION OF NEW YORK

PROJECTOR FOR STRIP FILMS

Application filed March 13, 1928. Serial No. 261,362.

This invention relates to optical projection apparatus and more particularly it refers to the type of apparatus which is used for the projection of still pictures which are arranged on a flexible picture strip.

One of the most important objects of the present invention is to provide a projector of the type described which will be simple in structure, efficient and convenient in operation and economical in production. Other objects are to provide a projector which can be formed largely of sheet metal and will be durable in construction and neat in appearance.

Other objects and advantages reside in certain novel features of construction, arrangement and combination of parts which will hereinafter be more fully described and pointed out in the appended claims.

Referring to the drawings:

Fig. 4 is a vertical sectional view through the apparatus, with parts shown in elevation.

Fig. 5 shows the presser plate assembly.

Fig. 6 shows the rear face of the aperture plate.

Similar reference characters refer to the same parts throughout the drawings.

Figure 1:
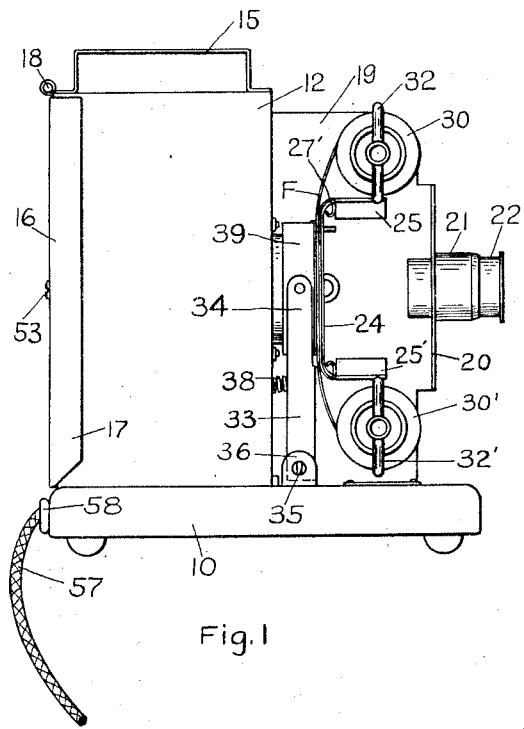
Fig. 1 shows a side elevation of the projector.

In the preferred embodiment of my projector, illustrated in the drawings, the base 10 is formed up of sheet metal and upstanding ears 11 are struck up from the base at the two sides thereof. A sheet metal lamp housing 12 is secured to the ears 11 and is provided with a top member 13 having an opening 14 which is surmounted by the ventilating dome 15. A door 16 having overlapping flanges 17 is pivoted at 18 and affords convenient access to the interior of the lamp housing.

A sheet metal bracket 19, secured to the front of the lamp housing 12 and to the base 10, projects forwardly of the lamp housing and then is bent right angularly to provide the laterally projecting portion 20. The lateral portion 20 carries a tubular member 21 in which is slidably mounted the lens tube 22 carrying the lens element 23.

An aperture plate 24 is formed up of a single piece of sheet metal and has integral ears or projections 25, 25' by means of which the aperture plate is secured to the bracket 19, as clearly shown in Figs. 1 and 4. The aperture plate 24 is provided with a film opening 26, with which the single frame or picture on the film F is brought into register for projection. The rear face of the aperture plate 24 carries two film tracks or shoes 27 and 27', arranged one on each side of the opening 26, as shown in Fig. 6. These film tracks or shoes serve to space the film slightly from the aperture plate so that only the marginal edges of the film bear on the tracks 27, 27', thereby eliminating scratching of the picture areas when the film is moved past the opening 26. The aperture plate 24 is also provided with two perforations or openings 28 and 29, the purpose of which will hereinafter be more fully described.

The film-carrying spools 30 and 30' are mounted to freely rotate on the respective stub shafts 31 and 31' which are secured to the bracket 19. Cross pins 32 and 32' are rigidly secured to the respective film spools 30 and 30', thereby providing convenient finger-engaging means for turning the spools on their respective shafts.

A support member 33 is formed with vertical side flanges which extend upward to provide the arms 34 and 34'. The support member 33 is pivotally mounted on a rod 35 which is held by bracket 19 and by an ear 36 which is struck up from the base 10. Fingers 37 are struck out from the member 33 and provide means for holding a coil spring 38 which is seated in a depression 38' in the front side of the housing. The spring 38 serves to normally urge the support member 33 forward so that the presser plate, to be hereinafter described, is normally held in contact with the aperture plate 24. A presser plate 39 is formed of sheet metal and is provided with vertical side flanges by means of which the presser plate 39 is pivotally mounted on the arms 34 and 34', as clearly shown in Fig. 5. The front face of the presser plate 39 is provided with a pair of film tracks or shoes 40 and 40', arranged one on each side of the film opening 41. The presser plate 39 is also provided with a pair of guide pins 42 and 42' which project forwardly from its front face.

As stated above, the spring 38 normally urges the presser plate 39 into contact with the aperture plate 24. When these two plates are in contact with each other, the film openings 26 and 41 are in alignment and the film tracks 40 and 40' cooperate with the tracks 27 and 27', respectively, to exert a clamping action for holding the film F in position for projection. The pins 42 and 42' serve to prevent the film from being laterally displaced from the tracks or shoes.

The pin 42 is longer than the pin 42' and when the presser plate 39 is moved away from the aperture plate, the pin 42' clears the aperture plate and permits the film to be inserted laterally to a position before the opening 26. The pin 42, however, does not clear the aperture plate even when the presser plate is moved backward to its limit, and hence the pin 42 always acts as a stop for limiting the lateral insertion of the film.

Figure 2:
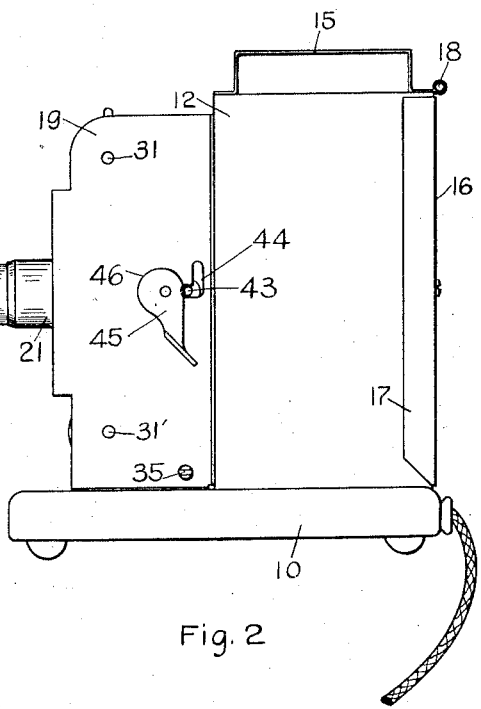
Fig. 2 shows the opposite side of the projector in elevation.
Figure 3:
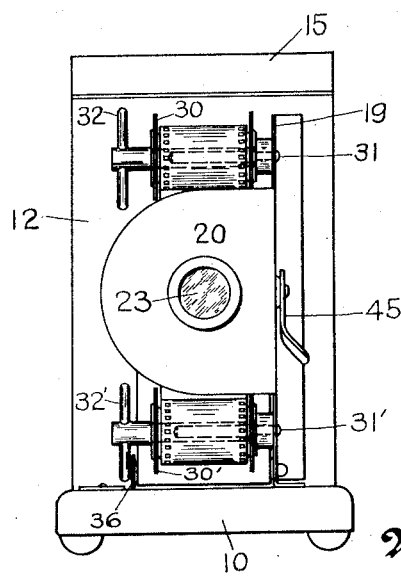
Fig. 3 shows the front of the projector in elevation.

Extending outwardly from the arm 34' of the member 33 is a pin 43 which projects through the opening 44 in the bracket 19. A cam member 45 having the cam edge 46 is pivotally mounted on the outside of bracket 19 as shown in Fig. 2. By rotating the member 45 in a clockwise direction, as shown in Fig. 2, the cam edge 46 is brought into contact with pin 43 and moves the pin rearward in the slot 44. Since the pin 43 is secured to arm 34', this rearward movement of the pin causes a rearward movement of the presser plate 39, and its support member 33, against the action of the spring 38. By turning the member 45 substantially half a revolution the presser plate 39 is moved rearwardly away from the aperture plate 24 and is held in locked position until released by turning back the member 45. This allows a film to be inserted and positioned for purposes of projection and permits the operator to have both hands free for these adjustments.

The illumination for the projector is furnished by an incandescent lamp 47 carried by a tubular socket 48 which is slidably mounted in a tubular member 49 and adapted to held held in adjusted position by a set screw 50. A curved reflector 51, preferably of polished metal, is secured to a post 52 which is fastened to the door of the lamp house by a screw 53. Suitable condensing lenses 54, 54' are held in a mounting 55 which is secured to the front wall of the lamp housing by means of screws 56. Electric current is supplied to the lamp by means of the conductor 57 which passes through a bushing 58 in the base 10.

In operating the projector, the presser plate 39 is first moved away from the aperture plate and held in locked position by means of the rotatable cam member 45. This permits of placing the film F, from the spool 30, in proper position before the film opening 26. The end of the film is then secured to the lower take-up spool 30'. By turning the cam member 45 the presser plate moves forward under the action of spring 38 thereby holding the edges of the film between the cooperating tracks or shoes 27, 27', and 40, 40'. The individual pictures or frames, which are arranged on the flexible film strip F, are then brought into proper position before the openings 26 and 41 by turning the lower take-up spool 30'. The tension of the spring 38 is such that it merely holds the film to prevent buckling at the aperture plate and still permits the film to be easily rolled up on the lower spool 30'. There are no gears or cog wheels for feeding the film and the film may be rolled freely in either direction from one spool to the other.

From the foregoing it will be apparent that I am able to attain the objects of my invention and provide a projector which will be simple in structure, yet efficient and convenient in operation and capable of being economically produced. It is to be understood that the specification and drawings are illustrative only and that various modifications may be constructed without departing from the spirit of my invention as pointed out in the appended claims.

I claim as my invention:

1. In a projection apparatus, a base, a lamp housing attached to said base, a bracket secured to the front of said housing and to said base, said bracket having a forward extension and a lateral extension, a lens mounted on said lateral extension, an aperture plate secured to said forward extension, and a presser plate movably mounted between said aperture plate and the front of said housing.

2. In a projection apparatus, a base, a lamp housing attached to said base, a bracket attached to the front of said housing and extending forwardly and thence laterally, a lens mounted on the lateral extension of said bracket, film spools mounted on the forward extension of said bracket, an aperture plate positioned between said film spools and a movably mounted presser plate normally held in contact with said aperture plate.

3. In a projector, the combination of a lamp housing, an aperture plate, means for mounting said aperture plate in cooperative relationship to said housing, a movably mounted presser plate, yieldable means for normally holding said presser plate in contact with said aperture plate, and cam means pivotally mounted on said first named means and adapted to engage said presser plate for moving and holding said presser plate away from said aperture plate.

4. In a projector of the type described, the combination of a base, a bracket secured to said base, an aperture plate attached to said bracket, an up-struck ear on said base, a member movably mounted on said ear and said bracket, a presser plate mounted on said member adjacent to said aperture plate, a spring mounted to urge said presser plate in contact with said aperture plate, and means on said bracket for moving and holding said presser plate away from said aperture plate against the action of said spring.

5. In a projector, the combination of a base having up-struck ears, a lamp housing attached to said ears, a bracket projecting forwardly from the front of said housing and thence laterally, an aperture plate mounted on the forwardly projecting portion of said bracket, a lens mounted on the laterally extending portion, a presser plate movably mounted between said aperture plate and the front of said housing, a spring normally acting upon said presser plate to move it against said aperture plate, and cam means mounted on said bracket for moving and holding said presser plate away from said aperture plate.

6. In a projector of the type described, a bracket, an aperture plate secured to said bracket, said aperture plate having a film aperture and spaced perforations, a movably mounted presser plate, yieldable means normally holding said presser plate against said aperture plate, and pins on said presser plate adapted to enter the perforations of said aperture plate, said pins and perforations being exteriorly of a film held between said aperture plate and said presser plate.

7. A projector comprising a base, a housing mounted on said base, a bracket secured both to said housing and to said base, an upstruck ear on said base, an aperture plate attached to said bracket, a member pivotally mounted on said bracket and said ear between said housing and said aperture plate, a presser plate mounted on said member adjacent said aperture plate, a spring to urge said presser plate into contact with the aperture plate, and means on said bracket for moving and holding said presser plate away from said aperture plate against the action of said spring.

WILLIAM L. PATTERSON.